Dec. 15, 1970
A. N. EDE
3,546,890
TRENCHLESS LAYING OF PIPE UNDERGROUND
Filed May 3, 1968
4 Sheets-Sheet 1
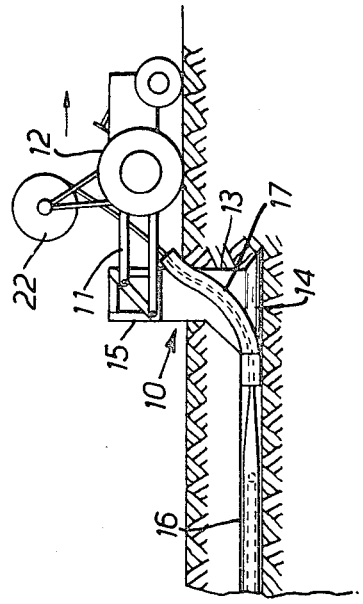
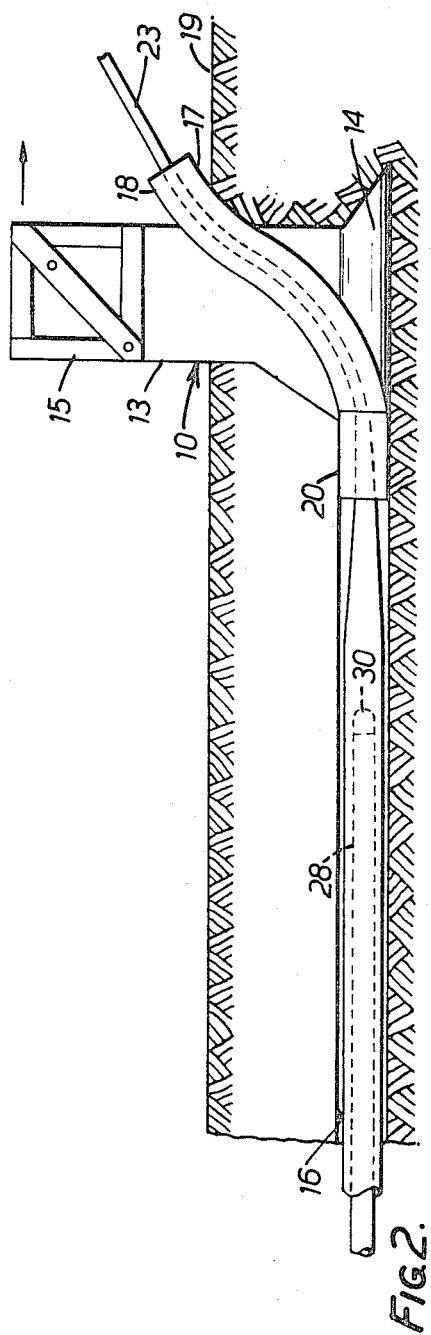
INVENTOR
AINSLEY N. EDE
BY
Watson, Cole, Grindle & Watson
ATTORNEYS Dec. 15, 1970   A. N. EDE   3,546,890
TRENCHLESS LAYING OF PIPE UNDERGROUND
Filed May 3, 1968   4 Sheets-Sheet 2

INVENTOR
AINSLEY N. EDE
BY
Watson, Cole, Grindle & Watson
ATTORNEYS

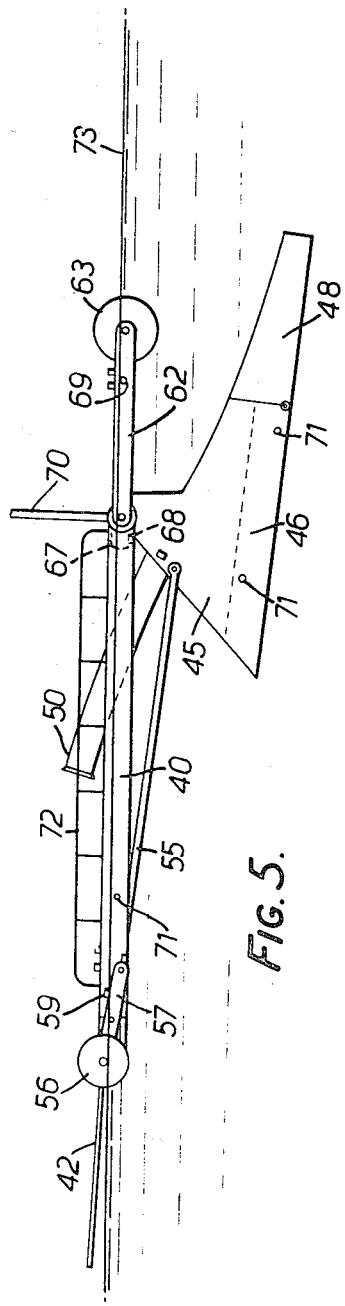
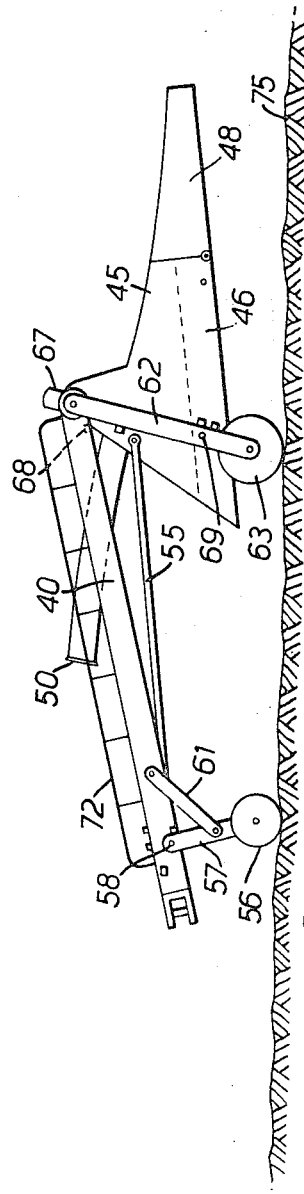

Dec. 15, 1970  A. N. EDE  3,546,890
TRENCHLESS LAYING OF PIPE UNDERGROUND
Filed May 3, 1968  4 Sheets-Sheet 4
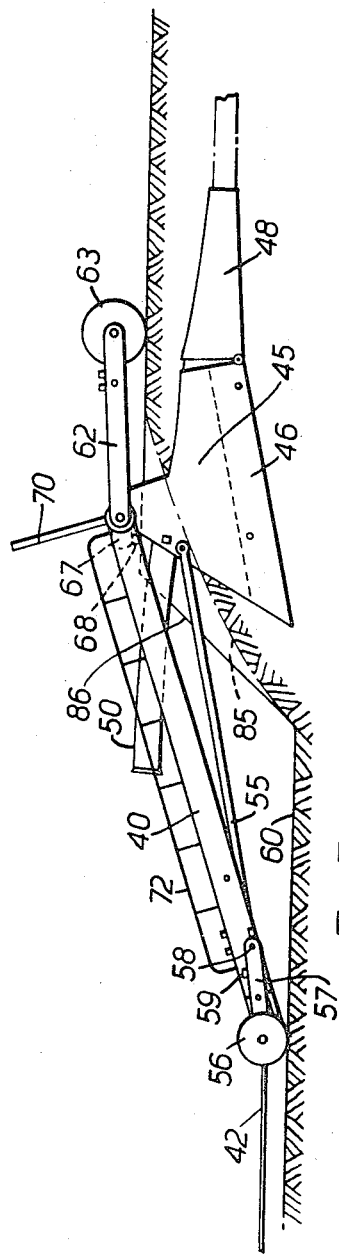
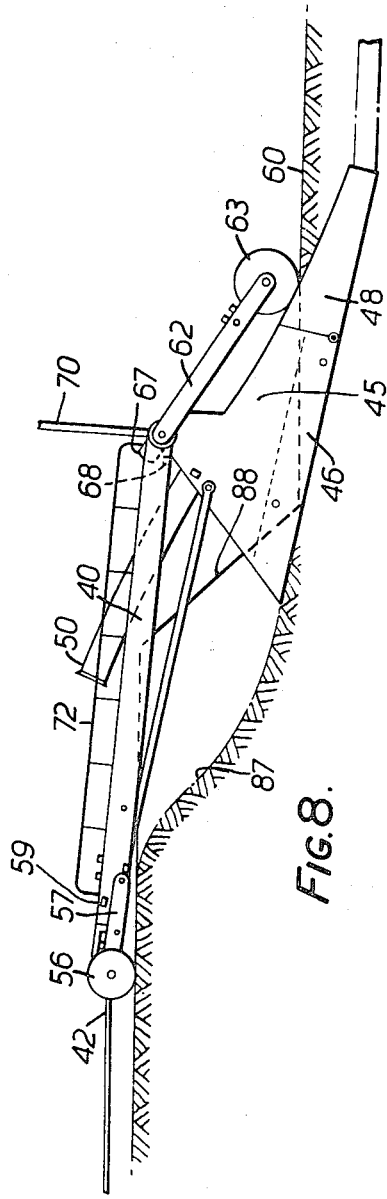
INVENTOR
AINSLEY N. EDE
BY
Watson, Cole, Grindle & Watson
ATTORNEYS

United States Patent Office 3,546,890
Patented Dec. 15, 1970

3,546,890
TRENCHLESS LAYING OF PIPE UNDERGROUND
Ainsley N. Ede, 36 Thornton Way, Cambridge, England
Filed May 3, 1968, Ser. No. 726,495
Claims priority, application Great Britain, May 3, 1967, 20,476/67
Int. Cl. F16l 1/00, 7/00
U.S. Cl. 61—72.6
4 Claims

ABSTRACT OF THE DISCLOSURE

The invention is a method and apparatus for the trenchless laying of pipe underground, in which a mole plough is forced through the ground by means of a tractor or winch to form an underground tunnel, and a continuous length of flexible sleeving, for example made of polythene, is fed down through the hollow coulter of the advancing mole plough and is laid in the newly-formed tunnel behind the mole; and at the same time a length of rigid pipe is thrust forwards lengthwise into the tunnel and within the sleeving laid behind the advancing mole plough, by means of a driving machine including sets of pneumatic-tyred driving rollers between which the pipe is frictionally engaged. The pipe length is forced forwardly within the sleeving from the start of the underground tunnel at a speed which is coordinated with the speed of travel of the mole plough, for example by means of a trailing marker, so that the leading end of the pipe length follows closely behind the rear of the advancing mole. In this way the pipe length is pushed into its final position enclosed in the protective sleeving which protects it against corrosive attack by soil water. If desired cement grout may be injected into the sleeving to form an auxiliary protective coating around the pipe.

Figure 3:
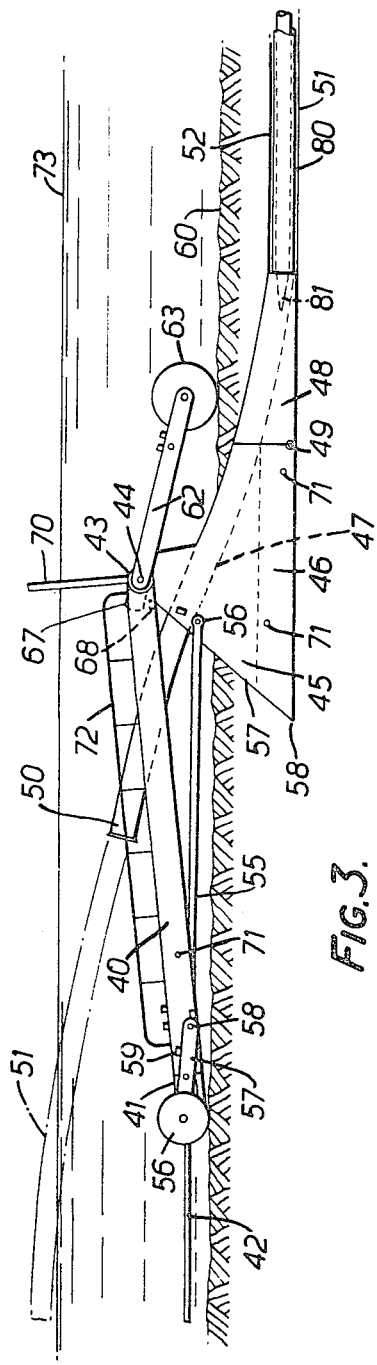

The specification also describes a modified form of mole plough designed to be used in a submerged position for pipe laying by the described method in a river bed or estuary bed, and to be rendered buoyant by means of compressed air for navigation purposes. This mole plough has a hollow framework and pivoted front and rear undercarriages with pivoted hollow rollers which also act as floats.

---

This invention relates to the laying of long lengths of pipe, for example water pipe, in situ underground by forming an underground tunnel by means of a mole plough and simultaneously forcing a length of the pipe along the newly-formed tunnel behind the mole into its required final position in the tunnel, for example by means of a hydraulic or pneumatic ram. By this method of trenchless pipelaying, a considerable length of pipe, perhaps 350 feet in length, can be laid in position underground with precision in a single operation without the need for opening up a trench to receive the pipe.

Where the pipe laid is metal, for example iron or steel, it is liable to corrosive attack by certain types of "aggressive" natural waters in the soil. It would be useless to attempt to protect the pipe from such attack by means of a surface coating of paint or plastic on the pipe, since this would be liable to be scraped off the pipe as the latter was forced through the newly-formed tunnel to its final position.

According to the present invention in a method of trenchless laying of pipe by forcing a length of pipe into position underground along a passage forced by a mole plough, a length of flexible sleeving is fed down underground through the advancing mole plough and is progressively laid in position behind the mole in the newly-formed tunnel to line the tunnel as the mole is advanced through the soil, the end of the sleeving being anchored at or near the start of the tunnel, and a length of pipe is thrust forwards lengthwise from behind along the newly-formed tunnel within the stationary flexible sleeving newly laid therein. Suitable power-driven thrusting means is employed to force the pipe length forwards, operating in a pit or at a face from which the pipe projects rearwardly and the tunnel leads forwardly. For example the thrusting means may consist of three rows of motor-driven rollers having pneumatic tyres, the rollers being distributed around the pipe with the tyres bearing on the outer surface of the pipe to drive it forward.

Conveniently the pipe length is thrust forward simultaneously with the advance of the mole plough at a speed coordinated therewith, so that the leading end of the pipe follows within the sleeving closely behind the advancing mole.

The pipe is thus forced directly into the flexible sleeve, as soon as the sleeve itself has been laid in position in the newly-formed tunnel behind the advancing mole, and the pipe nose thereby opens out the sleeve to the required tubular form in the tunnel so that the pipe itself is encased in the sleeve. The combined pipe and sleeve thus forms in effect an underground conduit system, the sleeve being relied on to protect the metal of the pipe against attack by aggressive soil waters. In addition, a grout of cement or the like may be forced through the coulter of the advancing mole plough into the annular space between the exterior of the metal pipe and the surrounding sleeve to form an auxiliary protective coating for the pipe.

The sleeve itself may be a plain or corrugated watertight flexible tube, for example made of polythene, or of any other suitable material or construction.

The invention according to another of its aspects comprises apparatus for the trenchless laying of pipe, which apparatus includes a mole plough having a mole mounted at the foot of a hollow coulter, an open-ended duct extending lengthwise through the coulter from above ground level to the rear end of the mole, the open rear end of the duct being directed rearwardly behind and in alignment with the rear end of the mole, a supply of flexible elongated sleeving wound on a reel mounted above the upper end of the duct, the sleeving being led or adapted to be led through the tubular duct for laying in an underground tunnel formed behind the mole as it is advanced through the ground, and power-actuated driving means for driving a length of pipe lengthwise into the tunnel behind the advancing mole and within the sleeving laid in the tunnel.

The method and apparatus described may be used for underwater pipe laying, for example beneath the bed of a river or estuary.

Figure 4:
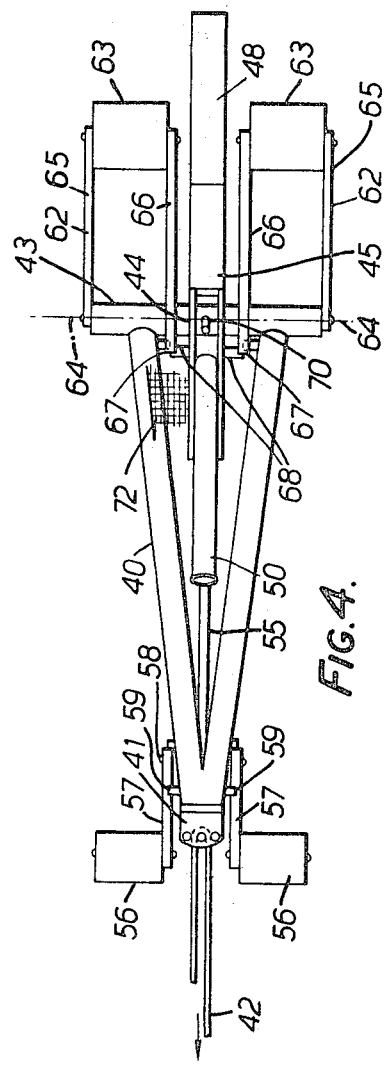

The invention may be carried into practice in various ways but two specific embodiments will now be described by way of example with reference to the accompanying drawings, in which:

FIG. 1 is a diagrammatic view of a rig for the trenchless laying of steel pipe underground, FIG. 2 is a view on a larger scale of the mole plough and sleeve duct of the apparatus of FIG. 1, showing the leading end of the steel pipe, FIG. 3 is a diagrammatic side elevation of a modified form of submersible mole plough, shown in use laying pipe beneath the bed of the sea or a river, FIG. 4 is a plan of the submersible mole plough of FIG. 3, FIG. 5 shows in elevation the submersible mole plough of FIGS. 3 and 4 in its floating condition for navigation, FIG. 6 shows the submersible mole plough of FIGS. 3 and 4 with its undercarriage lowered for towing on land, FIG. 7 shows how the submersible mole plough is towed into the bed of a river or estuary via a bank, and FIG. 8 shows the plough rising for exit through the oher bank of the river or estuary.

In the embodiment of FIGS. 1 and 2 a mole plough generally indicated at 10 is mounted on the hydraulic lift 11 of a towing tractor 12. The mole plough comprises a hollow coulter 13 at the foot of which is mounted a mole 14. The upper part 15 of the coulter is attached above ground level to the hydraulic lift 11 of the tractor 12, so that the tractor can be driven to tow the mole plough and draw the lower part of the coulter 13 and the mole 14 through the soil to form an underground tunnel 16 behind the mole.

The mole plough is provided with a rigid tubular duct 17 of slightly curved form which extends lengthwise through the interior of the hollow coulter 13. The open upper end 18 of the duct 17 is inclined forwardly and upwardly above the ground level 19, and the duct 17 extends downwardly through the coulter 13 at a mean inclination of about 40° to the horizontal, the open lower end 20 of the duct 17 being secured immediately behind and in alignment with the mole 14 and facing rearwardly.

Mounted on the tractor 12 above the top of the coulter 13 of the mole plough is a reel 22 on which is wound a supply of flexible tubular sleeving 23 made of a suitable flexible plastics material such as polythene. The flexible sleeving 23 is wound flat on the reel, and is drawn from the reel and is led lengthwise through the interior of the inclined duct 17 and out of the lower end 20 of the duct into the tunnel 16 formed by the advancing mole 14.

A trench 25 is formed in the ground at the start of a required run of underground pipe, and in the trench is mounted a pipe driving unit 26 having three sets of power-driven pneumatic-tyred rollers 27, between which a length of steel pipe 28 can be gripped. The length of steel pipe 28 to be laid in the underground tunnel 16 is introduced between the opposed rollers 27 and is gripped by the rollers for driving forwardly. The leading end of the pipe length 28 is inserted into the underground tunnel 16 within the open mouth of the flexible sleeving 23, the rear end of the sleeving 23 being opened out and anchored at 29 in the trench 25. The pipe driving means 26 is actuated to thrust the pipe length 28 forwardly within the interior of the sleeving 23 along the underground tunnel 16 behind the advancing mole 14. The movement of the pipe length 28 along the tunnel 16 is co-ordinated, by appropriate control of the pipe driving means 26, with the movement of the mole plough 10 in such a way that the leading end 30 of the pipe length 28 follows closely behind the rear end 20 of the sleeve duct 17, as shown in FIG. 2. If preferred the leading end 30 of the pipe 28 may even be maintained just within the open mouth of the rear end 20 of the duct 17 through which the flexible sleeving 23 is being drawn and led into the tunnel around the advancing pipe 28. This control of the relative position of the pipe end 30 may be performed conveniently by trailing a marker above ground behind the advancing mole plough 10 and so controlling the relative speeds of the mole plough 10 and the pipe 28 that the marker remains opposite the protruding rear end of the pipe 28 as the latter is driven forwardly by the driving means 26.

Eventually when the mole plough 10 reaches the end of its traverse, the whole of the pipe length 28 will have been inserted into the underground tunnel 16 with the exception of the rear end of the pipe which still protrudes into the trench 25 for connection purposes, and apart from this protruding rear end the whole of the pipe length 28 will be enclosed in the flexible sleeving 23 within the tunnel 16. The leading end 30 of the pipe length 28 may enter a forward trench formed in the ground, for connection purposes or to receive the pipe driving apparatus 26 for the purpose of driving a further length of pipe ahead of the pipe length 28 already laid.

If desired, after the pipe has been fixed into position in the tunnel within the interior of the flexible sleeving a grout of cement or like material may be injected under pressure into the annular-section space between the exterior of the pipe and the interior of the surrounding flexible sleeving, to form an auxiliary protective coating for the pipe.

The embodiment of the invention illustrated in FIGS. 3 to 8 comprises a rigid elongated frame 40 of tubular members, generally triangular in plan, the leading end of which carries a cable sheave 41 round which a towing cable 42 can be passed for winching the plough forwards. The horizontal rear end or base 43 of the triangular frame is pivoted transversely at 44 to the upper part of the hollow coulter 45 of the mole plough, the lower part 46 of which constitutes the mole. A hollow open-ended duct 47 extends through the coulter 45 within its interior, the duct 47 being inclined downwardly towards the rear end of the coulter and terminating directly behind the rear end of the mole in a hinged extension shell portion 48 of the combined coulter and mole, whose horizontal hinge axis 49 is at the bottom of the mole 46. At its forward and upper end the duct 47 is provided with a forwardly-extending inclined extension tube 50 through which the flexible sleeve 51 will be fed into the duct 47 and will be drawn out of its rear end through the hinged extension shell 48 and laid in an underground tunnel 52 newly-formed by the mole 46.

The coulter 45 is also rigidly attached to the A-shaped frame 40 by means of a rigid tiebar 55, extending below the frame, one end of the tiebar being attached to the leading end of the A-shaped frame and the other end being pinned at 56 to the inclined leading edge 57 of the coulter some distance above its pointed lower end 58. The A-frame 40, coulter 45 and tiebar 55 thus forms a rigid, self-supporting linkage structure.

Pivoted to the leading end of the A-frame 40 is a front undercarriage comprising two coaxial roller/floats 56 journalled on the lower ends of a pair of pivoted legs 57 one on each side of the A-frame 40, the other ends of the legs being pivoted at 58 to the side members of the A-frame near this junction. The legs are free to swing downwardly about their common pivotal axis 58 and their upward movement is limited by a pair of stops 59 protruding from the A-frame 40, which engage the legs 57 when they have swung slightly above the general plane of the A-frame 40. In this position the lower parts of the roller/floats 56, which are of large diameter, project downwardly below the A-frame 40 so that they can rest on the ground or seabed 60 and support the front of the machine for forward rolling movement with the legs 57 abutted nearly horizontally against the stops 59. The legs 57 are also provided with detachable stays 61 (FIG. 6) which can be pinned to them and to the A-frame 40 to lock them in downwardly-extending positions approximately at right angles to the plane of the frame 40.

At its rear end the A-frame 40 is also provided with a rear undercarriage comprising a pair of rear legs 62, longer than the front legs 57, and a pair of roller/floats 63 journalled to the outer ends of the legs 62. At their inner ends the rear legs 62 are pivoted at 64 to the tubular base member 43 of the A-frame 40, one on each side of the coulter 45. Each rear leg 62 comprises two rigid parallel members 65, 66 between the outer ends of which the associated float 63 is pivoted. One member 66 of each rear leg 62 has an extension 67 which engages a stop 68 on the frame 40 to limit the upward swinging movement of the legs 62 and floats 63 in a position in which the legs 62 are parallel with the plane of the A-frame 40, as shown in FIG. 5. Moreover the legs 62 can be swung down through an angle of approximately 120° from the upper limiting position and pinned to the sides of the coulter 45 in a locked position by means of pins 69 for land travel, as shown in FIG. 6.

An upwardly-projecting compressed air inlet pipe 70 is mounted on the hollow base member 43 of the A- frame 40 and projects upwardly for attachment of a source of compressed air. This compressed air admitted through the inlet pipe 70 can enter all the hollow members of the A-frame 40, the floats 56 and 63 and the coulter 45, which are interconnected for this purpose, and which are provided with bleed holes 71 at various places to allow the controlled escape of the compressed air. In this way these hollow parts of the machine can be filled with air, and the ingress of water prevented, to make the machine floatable for navigation purposes, or the compressed air supply can be shut off when it is desired to submerge the machine. Decking 72 may be laid across the top of the A-frame 40 and across the rear legs 62, and the machine when filled with compressed air can be towed floating on the water for navigation purposes, as shown in FIG. 5, relying on the buoyancy of the two pairs of roller/floats 56 and 63 and the other air-filled members with the coulter/mole assembly 45, 46, 48 suspended below the water level 73 and with the forward and rear undercarriage legs 57 and 62 raised against their stops.

For towing the machine on land, the forward and rear undercarriage legs 57 and 62 would be locked in their extreme downward positions by means of the detachably stays 61 and locking pins 69 respectively, as shown in FIG. 6, and the machine can then roll on the roller/floats 56 and 63 with the coulter/mole assembly 45, 46, 48 raised above ground level 75. For preparing the machine for land towing a block and tackle would be fixed between the forward and rear undercarriage legs 57 and 62 and tightened to draw the front and rear legs together and raise the coulter/mole assembly off the ground.

For pipe laying under the bed 60 of a river or estuary, the machine would be towed by means of a cable 42 passed round the towing sheave 41 with the compressed air supply cut off, the front end of the A-frame 40 being supported by the front undercarriage whose legs 57 would be abutted near-horizontally against their stops 59 and whose roller/floats 56 would roll along the river bed 60, as shown in FIG. 3. The combined coulter 45 and mole 46 would enter into the soil of the river bed 60 and would form an underground tunnel 52 below the river bed 60 at a controlled depth as the device was towed across the river bed, the rear undercarriage trailing freely on its pivots 44 under these conditions. During the traverse of the mole plough through the river bed in this way the depth of the mole 46 would be regulated by the angular position of the front undercarriage, controlled by the setting of the stops 59 for the front legs 57, which determines the effective front pivot point of the plough framework 40.

During the travel of the machine across the river bed, flexible sleeving 51 would be fed down through the tube 50 and the duct 47 extending through the coulter/mole assembly into the newly-formed underground tunnel 52 behind the mole, and at the same time steel pipe 80 would be forced forwardly through the tunnel 52 within the interior of the sleeve 51, as described above, the tip 81 of the steel pipe 80 being maintained just within the interior of the hinged rear extension portion 48 of the coulter/mole assembly.

The machine would enter the river or estuary through a ramp 85 cut in the river bank 86, as shown in FIG. 7, the front undercarriage roller floats 56 rolling down the ramp 85 and the mole plough cutting down at an appropriate angle through the bank 86 below the ramp 85 until it assumes its required grade beneath the river bed. Similarly for extraction at the far side of the river, a ramp 87 would be cut through the river bank 88 to let the machine be towed up the ramp, as shown in FIG. 8, travelling on its front undercarriage until the mole plough breaks out beyond the ramp.

What I claim as my invention and desire to secure by Letters Patent is:

1. A method of trenchless laying of pipe by forming an underground tunnel by means of a mole plough and forcing a length of pipe into position underground along the tunnel formed by the mole plough, which method comprises feeding a length of flexible sleeving down underground through the advancing mole plough so that it is progressively laid in position behind the mole in the newly-formed tunnel to line the tunnel as the mole is advanced through the soil, the end of the sleeving being anchored at or near the start of the tunnel, and thrusting a length of pipe forwards lengthwise from behind the mole plough along the newly formed tunnel and within the stationary flexible sleeving newly laid therein.

2. A method as claimed in claim 1 in which the length of pipe is thrust forwards simultaneously with the advance of the mole plough at a speed coordinated therewith so that the leading end of the pipe follows within the sleeving closely behind the advancing mole.

3. A method as claimed in claim 1 which includes forcing a grout of cement or like material into an annular space between the exterior of the metal pipe and the surrounding sleeve to form an auxiliary protective coating for the pipe.

4. A method as claimed in claim 1 in which the sleeve comprises a watertight flexible plastics tube of plain or corrugated form.

References Cited
UNITED STATES PATENTS

| | | | |
|---|---|---|---|
| 2,617,542 | 11/1952 | Styles et al. | 254—29X |
| 3,120,107 | 2/1964 | Juusela et al. | 61—72.6 |
| 3,193,432 | 7/1965 | Baines | 61—72.6X |
| 3,242,518 | 3/1966 | Prange | 226—189 |
| 3,313,115 | 4/1967 | Kniefel | 61—72.6 |
| 3,422,631 | 1/1969 | Silverman | 61—72.7X |

JACOB SHAPIRO, Primary Examiner

U.S. Cl. X.R.

61—72.4, 72.7; 226—189; 254—29